(12) United States Patent
Lieu

(10) Patent No.: US 8,842,810 B2
(45) Date of Patent: Sep. 23, 2014

(54) EMERGENCY COMMUNICATIONS MANAGEMENT

(75) Inventor: Tim V. Lieu, San Leandro, CA (US)

(73) Assignee: Tim Lieu, San Leandro, CA (US)

( * ) Notice: Subject to any disclaimer, the term of this patent is extended or adjusted under 35 U.S.C. 154(b) by 0 days.

(21) Appl. No.: 13/481,716

(22) Filed: May 25, 2012

(65) Prior Publication Data

US 2013/0315383 A1   Nov. 28, 2013

(51) Int. Cl.
*H04M 11/04* (2006.01)

(52) U.S. Cl.
USPC .......................................... 379/39; 455/550.1

(58) Field of Classification Search
USPC ....................................................... 379/37–52
See application file for complete search history.

(56) References Cited

U.S. PATENT DOCUMENTS

| | | | | |
|---|---|---|---|---|
| 2003/0012344 | A1* | 1/2003 | Agarwal et al. | 379/37 |
| 2005/0085257 | A1* | 4/2005 | Laird et al. | 455/550.1 |
| 2005/0207402 | A1* | 9/2005 | Kobayashi et al. | 370/352 |
| 2010/0094652 | A1* | 4/2010 | Dorsett | 726/1 |
| 2010/0245596 | A1* | 9/2010 | Tirpak et al. | 348/207.1 |
| 2011/0255670 | A1* | 10/2011 | Seidberg et al. | 379/45 |
| 2011/0300837 | A1* | 12/2011 | Misiag | 455/414.2 |

* cited by examiner

*Primary Examiner* — Maria El-Zoobi
(74) *Attorney, Agent, or Firm* — Carr & Ferrell LLP

(57) ABSTRACT

Emergency communications systems and methods are provided herein. According to some embodiments, methods for mediating transmission of an emergency communication may include establishing a communications path between an emergency response entity and a communications device of a reporting party in response to an emergency event, and delivering to the emergency response entity an alert communication from the communications device, the alert communication comprising at least a location of the communications device and visual content captured by the communications device.

11 Claims, 16 Drawing Sheets

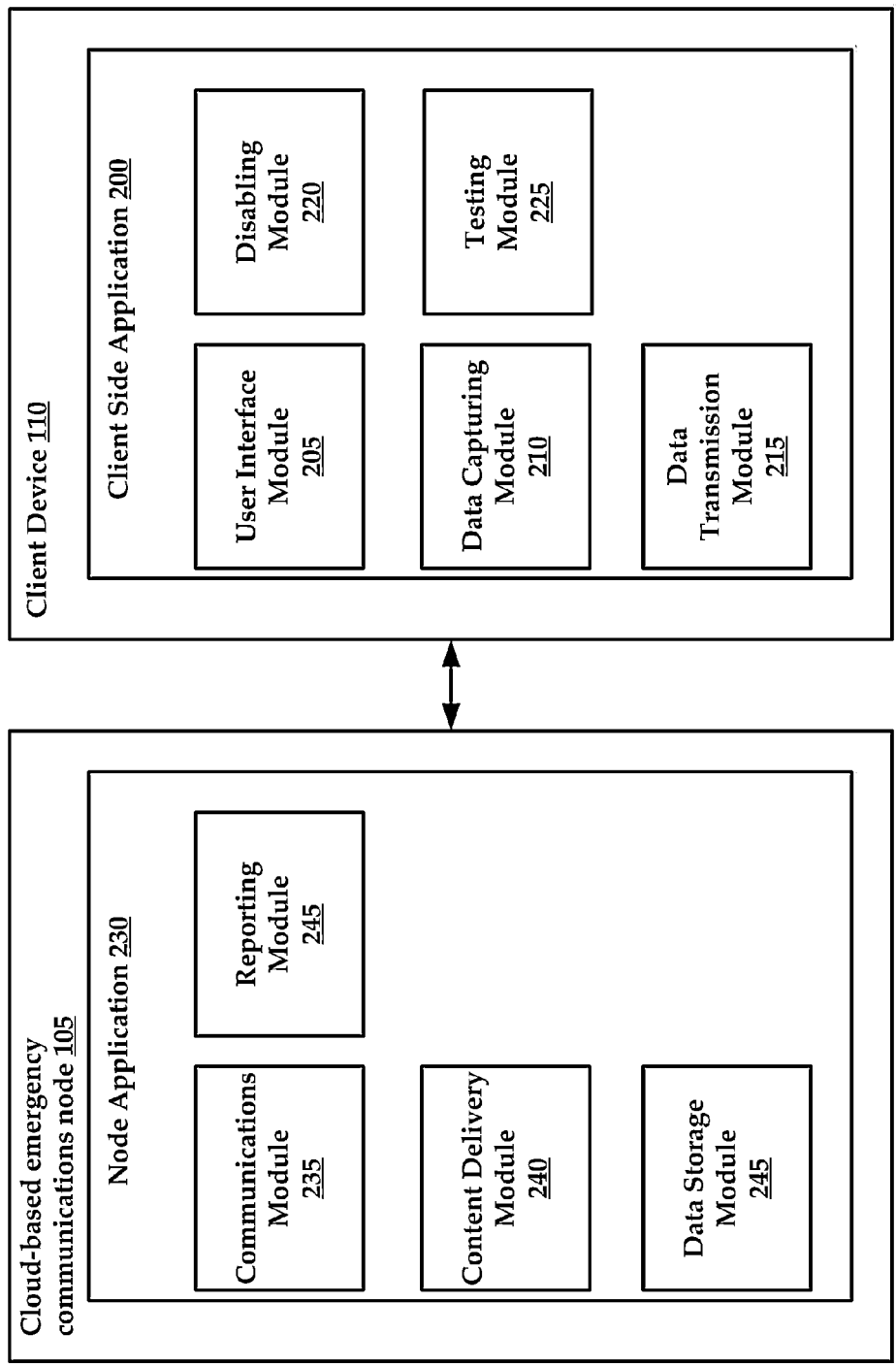

EMERGENCY COMMUNICATIONS MANAGEMENT

FIELD OF THE PRESENT TECHNOLOGY

The present technology relates generally to emergency communications systems, and more specifically, but not by way of limitation, emergency communications systems that allow communications devices operated by reporting parties to transmit emergency communications to emergency response entities, emergency contacts, and/or other third parties. The present technology may employ a client side application that captures real-time or near real-time information about the reporting party and/or the communications device.

BACKGROUND

Emergency events such as accidents are a common occurrence. Additionally, mobile communications devices are ubiquitous and often include various data capturing features such as microphones, data recorders, cameras, video cameras, and so forth. Moreover, systems that interact with these mobile devices such as cellular communications systems, WiFi hotspots, and so forth are often in periodic or continual communications with mobile devices. These systems may capture various types of data about the mobile device such as location, MAC address, IMEI, ANI, or other discernible data. What is needed is a system that leverages the vast and varied amount of data that can be captured by mobile computing devices in enhanced emergency communications.

SUMMARY OF THE PRESENT TECHNOLOGY

According to some embodiments, the present technology may be directed to methods for mediating transmission of an emergency communication. These methods may comprise: (a) establishing a communications path between an emergency response entity and a communications device of a reporting party in response to an emergency event; and (b) delivering to the emergency response entity an alert communication from the communications device, the alert communication comprising at least a location of the communications device and visual content captured by the communications device.

According to other embodiments, the present technology may be directed to methods for transmitting an alert communication. These methods may comprise: (a) activating at least one media capturing device of a communications device associated with a reporting party upon an occurrence of an emergency event; (b) establishing a communications path with an emergency response entity; and (c) transmitting a location of the communications device and visual content captured by the at least one media capturing device of the communications device to the emergency response entity.

According to additional embodiments, the present technology may be directed to systems for mediating an emergency communication. These systems may comprise: (a) a memory for storing executable instructions; (b) a processor for executing the executable instructions, the executable instructions comprising: (i) a communications module that establishes a communications path between an emergency response entity and a communications device of a reporting party in response to an emergency event; and (ii) a content delivery module that delivers to the emergency response entity an alert communication from the communications device, the alert communication comprising at least a location of the communications device and visual content captured by the communications device.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIGS. 2A and 2B are block diagrams of an exemplary client side application (2A) and a node application (2B) for practicing aspects of the present technology.

DETAILED DESCRIPTION OF EXEMPLARY EMBODIMENTS

Figure 1:
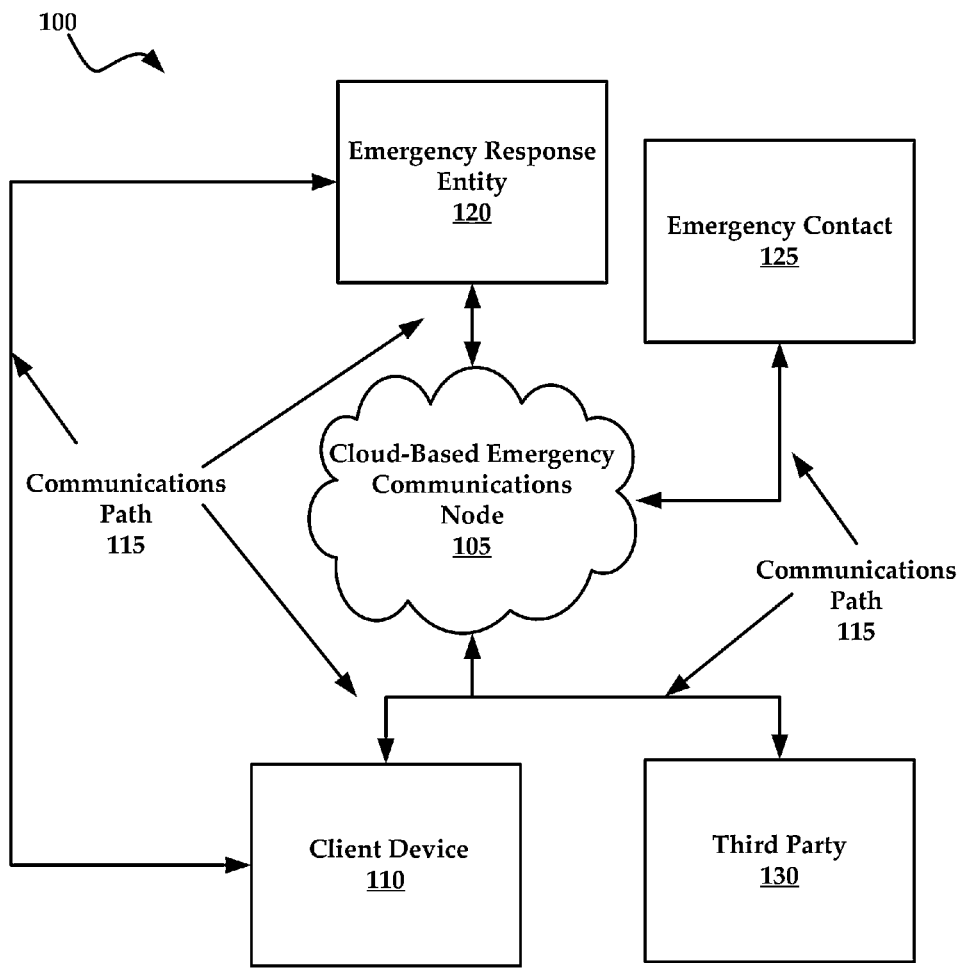
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed to systems and methods for providing alert communications. According to some embodiments, the present technology may employ a cloud-based communications node that establishes communications paths between emergency response entities and a client mobile device, as well as emergency contacts and/or third parties, as will be described in greater detail below.

Using native features of the mobile device, the client side application may capture a vast array of pertinent emergency event data such as location data, image data, video data, audio data, multimedia data, and so forth. These various types of data captured by a client side application may be transmitted from the mobile device to any of the aforementioned entities using the established communications paths.

The present technology may also store and aggregate alert communications and client side data to produce reports that are provided to authorities. These and other advantages of the present technology will be described in greater detail below with reference to the collective drawings (e.g., FIGS. 1-14).

FIG. 1 illustrates an exemplary architecture 100 for practicing aspects of the present technology. According to some embodiments, the exemplary architecture 100, hereinafter "architecture 100," may generally include a cloud-based emergency communications node, hereinafter "node 105." Reporting parties (e.g., end users) may interact with the node 105 using a communications device 110 that includes a client side application, which will be described in greater detail below. In other embodiments, translators may interact with the node 105 via a web based interface.

The communications device 110 and the node 105 may be communicatively coupled via a communications path 115. It is noteworthy to mention that the communications path 115 may include any one (or combination) of private or public communications networks such as the Internet. According to some embodiments, the communications path 115 may comprise a telecommunications path, such as any public switched telephone network ("PSTN"). The communications path 115 may also comprise a voice over Internet protocol ("VoIP") connection established over a cellular telephone data path or a WiFi connection.

The node 105 may establish communications paths between the communications device 110 and any of an emergency response entity 120, an emergency contact 125 and/or any third party 130 of the reporting party's choosing. Generally speaking, the emergency response entity 120 may include any exemplary emergency response entity such as a 911 call center, a police department, a fire department, or other emergency response entity, call center, and/or operations center that would be known to one of ordinary skill in the art with the present disclosure before them.

The emergency contact 125 may comprise any individual, for example, a spouse, a parent, a child, a friend, an acquaintance, or any other individual of the reporting party's choosing. Contact information, such as a telephone number, short dialing code, speed dial number, email address, for the emergency contact 125 may be included in a list of emergency contacts that are stored in the client side application. Similarly, the third party 130 may comprise, for example, an insurance company, a wrecker company, an insurance company, or any other third party of the reporting party's choosing. The third party contact information may be stored in the client side application as well.

According to some embodiments, the node 105 may be implemented within a cloud-based computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

For purposes of clarity, descriptive details for the communications device 110 will be discussed initially, prior to presentation of descriptive details for node 105. FIG. 2A is a block diagram of an exemplary client side application 200 that executes on the communication device 110 of the reporting party. As will be described greater detail below, a client side application may also be executed on a communications device of an emergency contact and/or a third party communications device. These communications devices for both emergency contacts and third parties may include any general purpose computing device, such as the computing system 1300 of FIG. 13, which includes a client side application 200.

Generally speaking, the client side application 200 may cause the communication device 110 to perform a method of transmitting an alert communication. The communications device 110 may execute a client side application that interacts with the node 105. The client side application may activate at least one media capturing device of the communications device associated with a reporting party upon an occurrence of an emergency event. Additionally, the client side application may establish a communications path with an emergency response entity, via the node 105. The client side application may also transmit a location of the communications device and visual content captured by the at least one media capturing device of the communications device to the emergency response entity via the node 105. In the event that the node 105 is malfunctioning, the communications device 110 may attempt to establish a communications path with the emergency response entity, emergency contact, and/or the third party directly.

According to some embodiments, the client side application 200 may comprise a user interface module 205, a data capturing module 210, a data transmission module 215, an optional disabling module 220, and an optional testing module 225.

The user interface module 205 may be executed to generate various types of user interfaces that may be utilized by a reporting party to input data and interact with the node 105. Exemplary user interfaces generated by the user interface module 205 are illustrated in FIGS. 4-12, which will be described in greater detail infra.

In some instances, the user interface module 205 may provide a map that includes a list of emergency events. These emergency events may include events that have occurred within a given time period and a given location that are proximate the location of the communications device of the reporting party.

Additionally, the user interface module 205 may provide advertisements to the communications device of the reporting party, where the advertisements are associated with merchants located within the given location. For example, the advertisements may represent merchants within a mapped area that is proximate the current location of the communications device.

In some embodiments, the reporting party may establish an emergency contact list that includes contact information for one or more emergency contacts. For example, contact information may include a telephone number, an Internet protocol address, or other contact information that may be utilized by the node 105 to establish a communications path between the communications device and the emergency response entity/emergency contact/third party. The client side application 200 may also include contact information for a list of emergency response entities that may be input by the reporting party. In other embodiments, the list may be downloaded or obtained from an authorized source such as a governmental website or an online phone book.

The reporting party may also implement other ancillary features such as timers that regulate how many times (or a ring duration) the node 105 may attempt to establish a communications path before terminating or establishing an alternative communications path. Additionally, the reporting party may setup a redial feature that allows the node 105 to redial a party or entity a predetermine amount of times.

The client side application 200 may be activated or launched on the communications device 110 by way of native voice activation features of the communications device 110. In other instances, the application 200 may be launched by way of input such as a tap, gesture, motion-based input, proximity sensed input, and so forth.

Once launched (typically upon the occurrence of an emergency event), the application 200 may attempt to establish a communications path between an emergency response entity and one or more of the emergency contacts included in the list of emergency contact specified by the reporting party. In some instances, the application 200 may attempt to establish a communications path with an alternate emergency response entity when a communications path with a first emergency response entity cannot be established. For example, when 911 dispatch is unavailable, the application 200 may alternately attempt to contact the nearest police station or fire department.

The application 200 may also periodically attempt to reconnect to an emergency response entity when the application fails to establish a communications path, such as when a phone number associated with an emergency response entity is busy or otherwise unavailable.

Additionally, the data capturing module 210 to engage one or more data capturing devices of the communications device, such as a microphone, a video camera, a camera, a webcam, or any other native or peripheral data capturing device that would be known to one or ordinary skill in the art.

Once a communications path has been established between the communications device and any of the other devices/parties described herein via the node 105, the data transmission module 215 may be executed to being transmitting data captured by the data capturing module 210 using the established communications path. In some instances, the node 105 may establish multiple channels for transmitting information. For example, the node 105 may establish a telecommunications path (first channel) and a data transmission path (second channel) between the communications device and the emergency response entity using, for example, TCP/IP. Thus, the communications device may transmit both voice data and image/video data to the emergency response entity on separate channels.

Generally speaking, the alert communication may comprise at least an open telecommunications path, location based data corresponding to the communications device, an image captured by the communications device, or any combinations thereof.

According to some embodiments, the alert communication may comprise any of telecommunications data, a voice over Internet protocol data, image data, video data, audio data, multimedia data, a gesture-based input, a motion-based input, a continuous or periodic content feed, a short message service message, a status update, or any combinations thereof.

In some embodiments, the steps of activating at least one media capturing device of a communications device associated with a reporting party upon the occurrence of an emergency event and establishing a communications path with an emergency response entity occur upon receipt of a sound-based input command received by the communications device.

In some instances, the data capturing module 210 may periodically activate an image capturing device of the communications device to obtain image files over a period of time. The data transmission module 215 may then upload the image files from the communications device to the node 105, and ultimately to the emergency response entity. The image capturing device of the communications device may capture, for example, a picture of the surrounding location which may be analyzed for information such as street signs, building numbers, license plates, facial images, landmarks, and so forth. These images or videos may be cropped or otherwise processed using the node 105, as will be described below.

The data capturing module 210 may also record or store at least a portion of the alert communication, such as a telephone call. Additionally, the data transmission module 215 may provide at least a portion of the alert communication to at least one non-emergency response entity (e.g., third party) such as an insurance company. For example, if a reporting party is involved in a traffic incident, the data transmission module 215 may provide audio capture during the emergency event.

In some instances, the reporting party may transmit a silence message to the emergency response entity to inform the emergency response entity that verbal communication is prohibited. For example, in an emergency event, such as a home invasion, the reporting party may be afraid to speak. Using a button provided on a user interface, the reporting party may select a silence alert message. Thus, the data capturing module 210 may continue to capture and transmit other types of data such as sound/voice data, image files, and so forth to the node 105.

In some instances, the application 200 may require authentication of the reporting party prior to transmitting the alert communication. Authentication information may be used to ensure that the end user that is currently using the communications device is authorized to do so. For example, authentication information may comprise any of a username, password, a voiceprint, and/or other biometric information that may be used to authenticate the end user. In some instances, the communications device and node may exchange public/private keys or participate in other similar authentication methods.

According to some embodiments, the disabling module 220 may be utilized to disable the communications device. In some instances, the disabling module 220 may receive a disable command by the communications device from an authorized party. Exemplary authorized parties may include, but are not limited to, the reporting party, a law enforcement entity, or any other party that has been given authority to disable the communications device. In some instances, a disable command may comprise sound-based input received by the communications device. For example, the reporting party may speak a disable command over a telecommunications path or directly into the communications device.

In accordance with the present disclosure, the application 200 may include a testing module 225 that prior to establishing a communications path with an emergency response entity, may execute a test transmission of an alert communication. The testing module 225 may transmit a location of the communications device and visual content captured by the at least one media capturing device of the communications device to the node 105, which is, in turn, communicatively couplable with the emergency response entity, the communications device, and one or more emergency contacts.

The node 105 may send a test signal to any of the emergency response entity and the one or more emergency contacts and a verification or failure message back to the communications device, depending upon whether the emergency response entity and the one or more emergency contacts successfully responded to the test signal.

In some instances, the application 200 may cause the communications device to play an audible sound from upon an occurrence of an emergency event. For example, the application 200 may cause the communications device to play a siren sound or other loud and/or distinctive sound that may alert bystanders to the emergency event.

FIG. 2B is a block diagram of an exemplary node application 230 that resides on the node 105. According to some embodiments, when executed, the node application 230 may cause the node 105 to perform a method for mediating transmission of an emergency communication. The node application 230 may establish a communications path between an emergency response entity and a communications device of a reporting party in response to an emergency event. Additionally, the node application 230 may deliver to the emergency response entity an alert communication from the communications device. It will be understood that the alert communication may comprise at least a location of the communications device and visual content captured by the communications device.

More specifically, the node application 230 may comprise a communications module 235, a content delivery module 240, a data storage module 245, and a reporting module 250. It is noteworthy that the node application 230 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the node application 230 may include separately configured web servers.

The communications module 235 may be executed to establish a communications path between the communications device and any of the entities shown in FIG. 1. Thus, the node 105 may act as a communications intermediary between many of the devices described herein. For example, the node 105 may allow one or more emergency contacts to receive a telecommunications feed between the responding party and the emergency response entity, as well as any other types of data communicated therebetween, such a images, video, or other data.

The emergency contact module 240 may be employed to select at least one emergency contact with which a communication path is to be established based upon a location of the communications device of an emergency contact relative to the location of the communications device associated with the reporting party. Thus, because the reporting party and emergency contact are providing their location data to the node 105, the node 105 may intelligently provide alert messages to an emergency contact that is close to the reporting party.

In some instances, the emergency contact module 240 may facilitate an exchange of communication between communications devices associated with two or more emergency contacts. Thus, when two or more emergency contacts are utilizing the client side application and an emergency alert is received from a reporting party, the two or more emergency contacts may exchange messages or other communications regarding the alert communication.

When a reporting party enters a list of emergency contacts, the emergency contact module 240 may provide notification to a communications device associated with each emergency contact. In some embodiments the notification may request confirmation for adding the emergency contact to an emergency contact list.

In some instances, the notification may comprise any of a short message service message, an email message, or combinations thereof, the notification message comprising a link for downloading a client application that enables communication between the communications device of the reporting party and at least one communications device associated with the emergency contact.

The node application 200 and specifically the content delivery module 245 may be adapted to provide a continuous feed to the emergency response entity via a user interface. It is noteworthy that the user interface may comprise controls that allow the emergency response entity to interact with the continuous feed. For example, the emergency response entity may receive a video feed from the communications device. The emergency response entity may pause, rewind, fast forward, zoom, or utilize any other review functionality commonly utilized with video, audio, and/or multimedia feeds such as streams, files, or combinations thereof.

In some instances, the node application 200 may pre-process content received from the reporting party to determine distinguishing features included in an image or video file, stream, or feed. Distinguishing features may comprise any of a street sign, building number, license plate, facial images, landmarks, etc. The content delivery module 245 may then transmit these distinguishing features included in the image files to an authority, such as an emergency response entity or third party.

In other embodiments, the node application 200 may employ speech recognition to sound input received from the communications device to distinguish speakers included in the sound input. The node application 200 may utilize any speech recognition or speaking recognition functionalities that would be known to one of ordinary skill in the art with the present disclosure before them.

The reporting module 250 may be executed to generate a report that comprises alert communications received from communications devices associated with reporting entities. In some instances, alert communications may be grouped into a report based upon location information included in the alert communications. Thus, a requesting party may input a zip code or other location boundaries and the reporting module 250 may generate a report that includes alert communications for the location. Again, these reports may include not only general information about the emergency events, but also captured data such as images, video, recorded audio, and so forth.

According to some embodiments, the node application 200 may continuously monitor the location of any of the communications device associated with the reporting party and a communications device associated with at least one emergency contact; and providing the location to an authorized party. Additionally, the node application 200 may interact with a satellite image capturing system to capture a satellite image that includes the location of the communications device of the reporting party.

Additionally, the node application 200 may provide a directory of emergency response entity records to the communications device of the reporting party. The directory may be provided to the reporting party via a user interface and may comprise at least a name and phone number for an emergency response entity.

In other embodiments, the node application 200 may transmit a forwarding request from at least one emergency contact to at least one other party as well as establish a communications path that allows the at least one other party to also receive the alert communication.

Figure 3A:
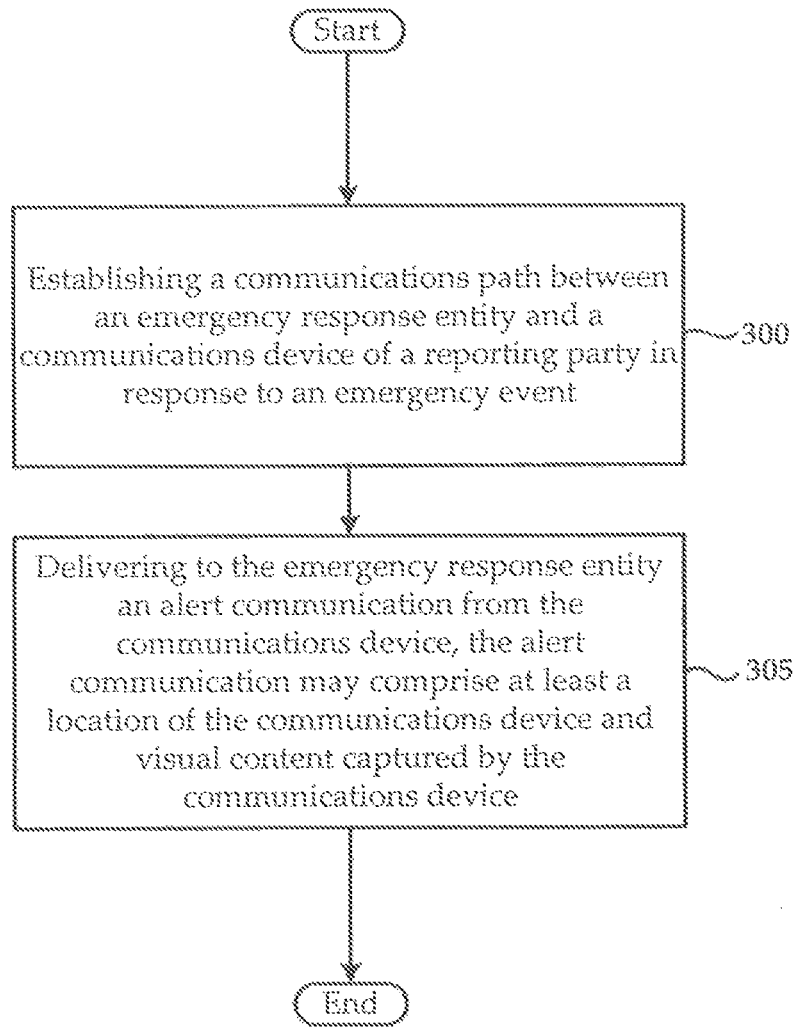
FIG. 3A is a flowchart of an exemplary method for mediating transmission of an emergency communication.

FIG. 3A is a flowchart of an exemplary method for mediating transmission of an emergency communication. The method may comprise a step 300 of establishing a communications path between an emergency response entity and a communications device of a reporting party in response to an emergency event. Next, the method may comprise a step 305 of delivering to the emergency response entity an alert communication from the communications device. Again, the alert communication may comprise at least a location of the communications device and visual content captured by the communications device.

Figure 3B:
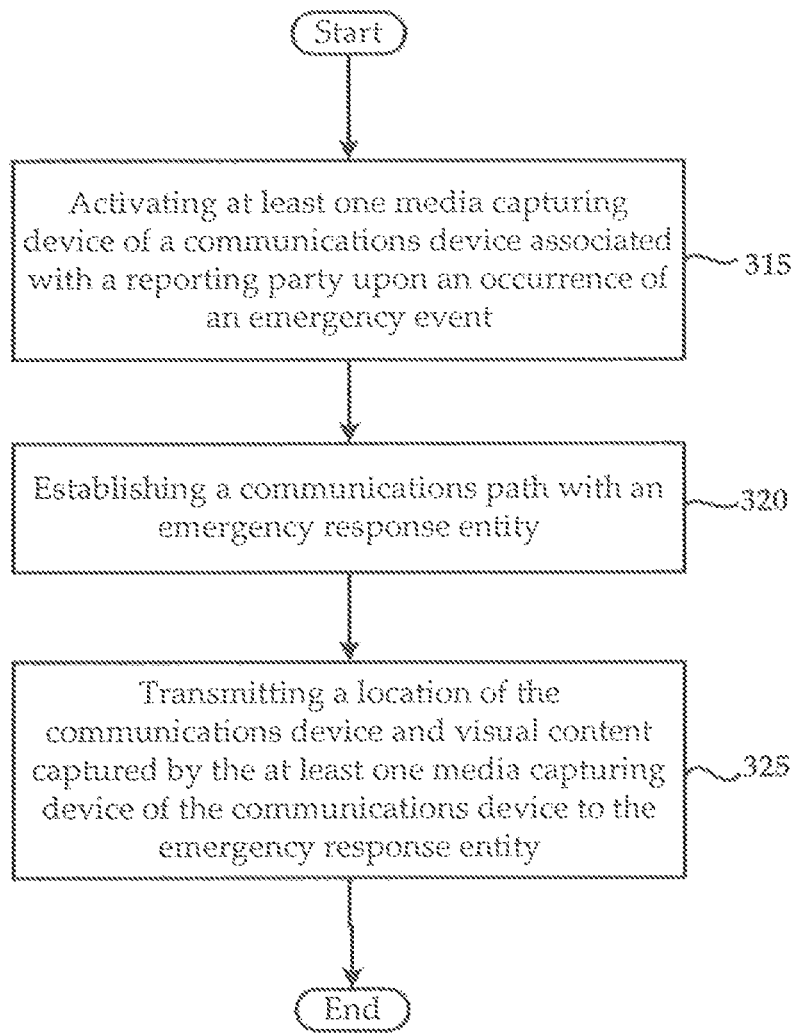
FIG. 3B is a flowchart of an exemplary method for transmitting an alert communication.

FIG. 3B is a flowchart of an exemplary method for transmitting an alert communication. The method may comprise a step 310 of activating at least one media capturing device of a communications device associated with a reporting party upon an occurrence of an emergency event. Next, the method may comprise a step 315 of establishing a communications path with an emergency response entity, as well as a step 320 of transmitting a location of the communications device and visual content captured by the at least one media capturing device of the communications device to the emergency response entity.

Figure 4:
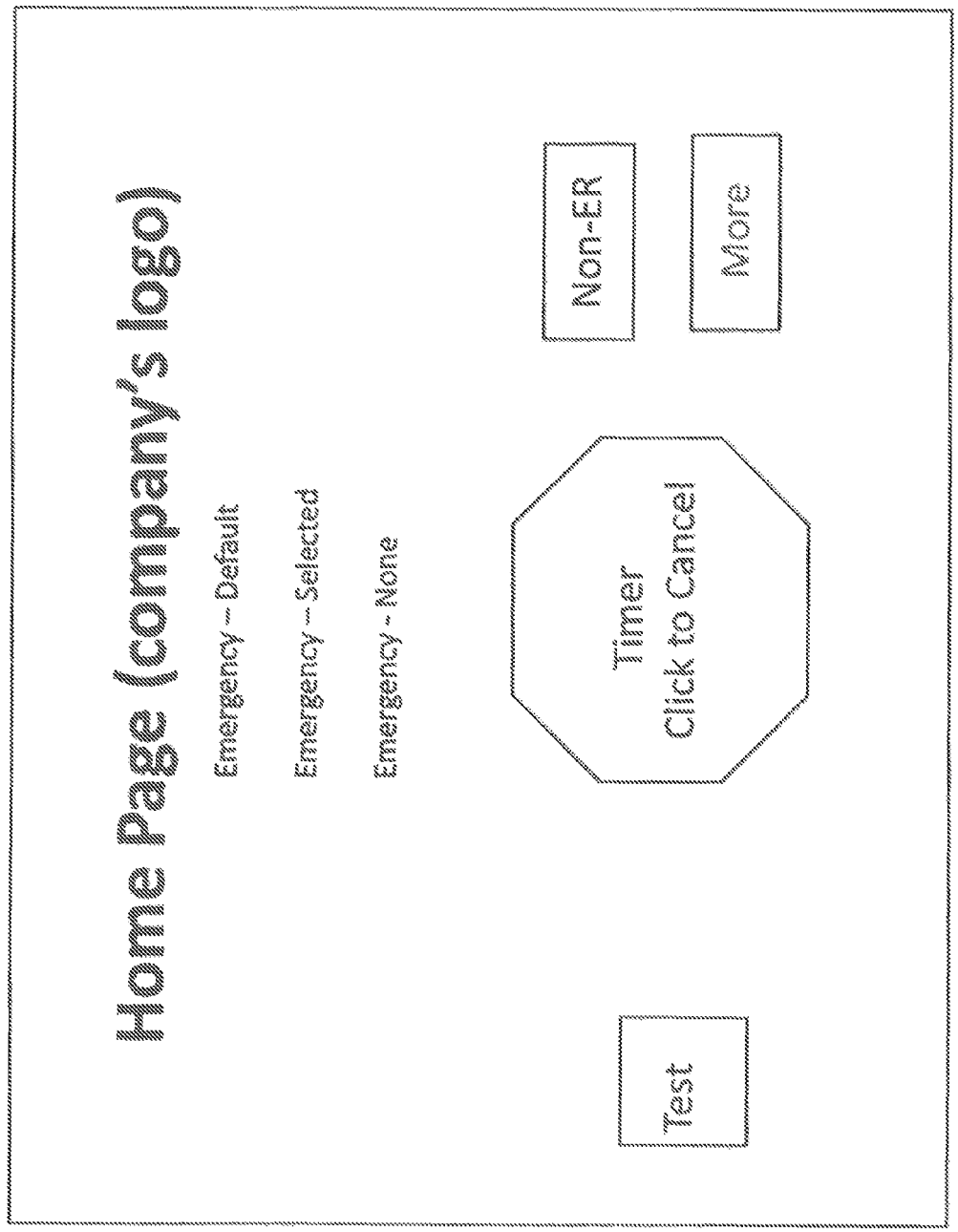
FIG. 4 is an exemplary user interface in the form of a home page.

FIG. 4 is an exemplary user interface in the form of a home page. The home page is shown as comprising a Test button, a Timer/Click to Cancel button, a Settings button, and a Non-E.R. button that allows the reporting party to contact a non-emergency response party (e.g., third party).

Figure 5:
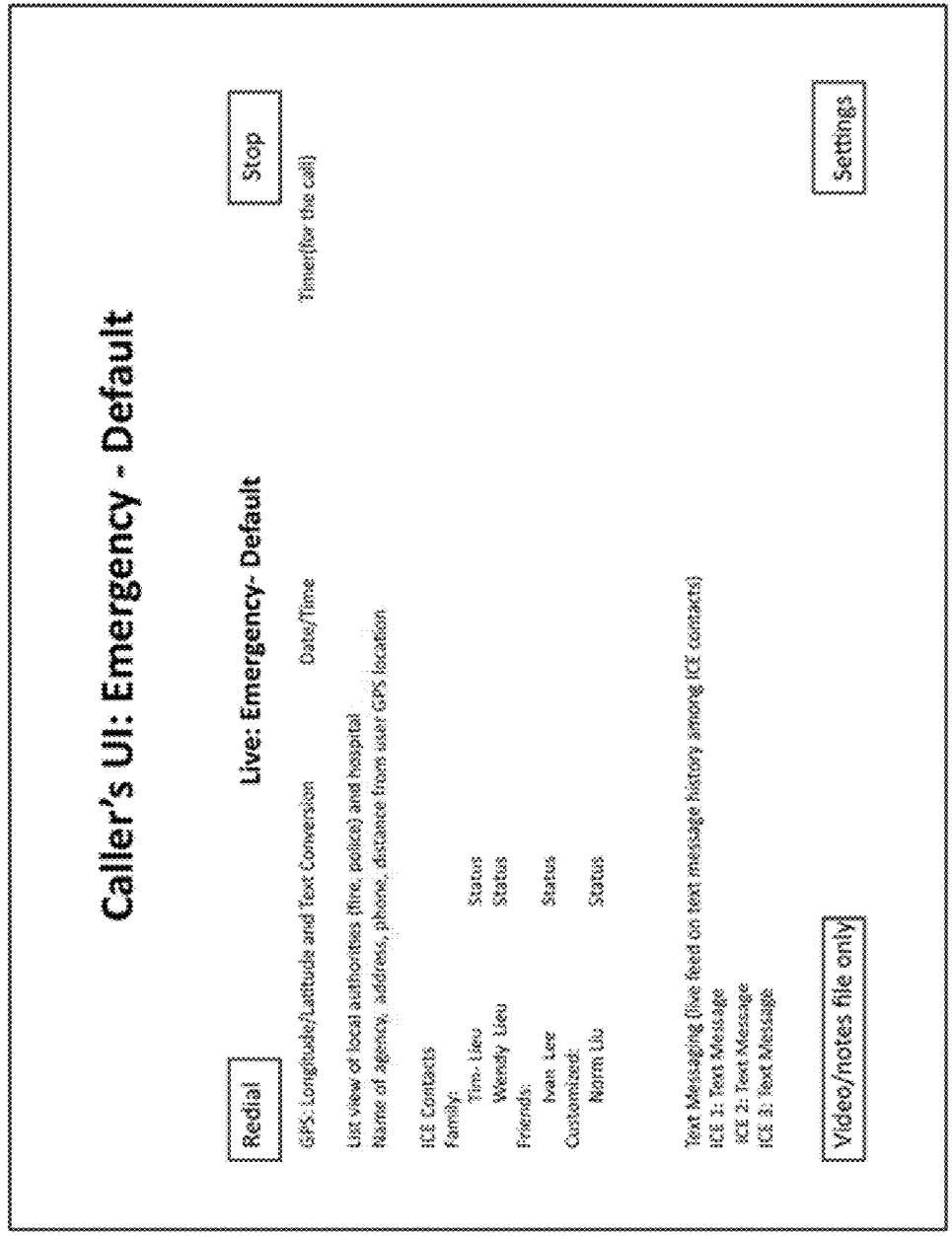
FIG. 5 is an exemplary user interface in the form of an emergency default information page.
Figure 6:
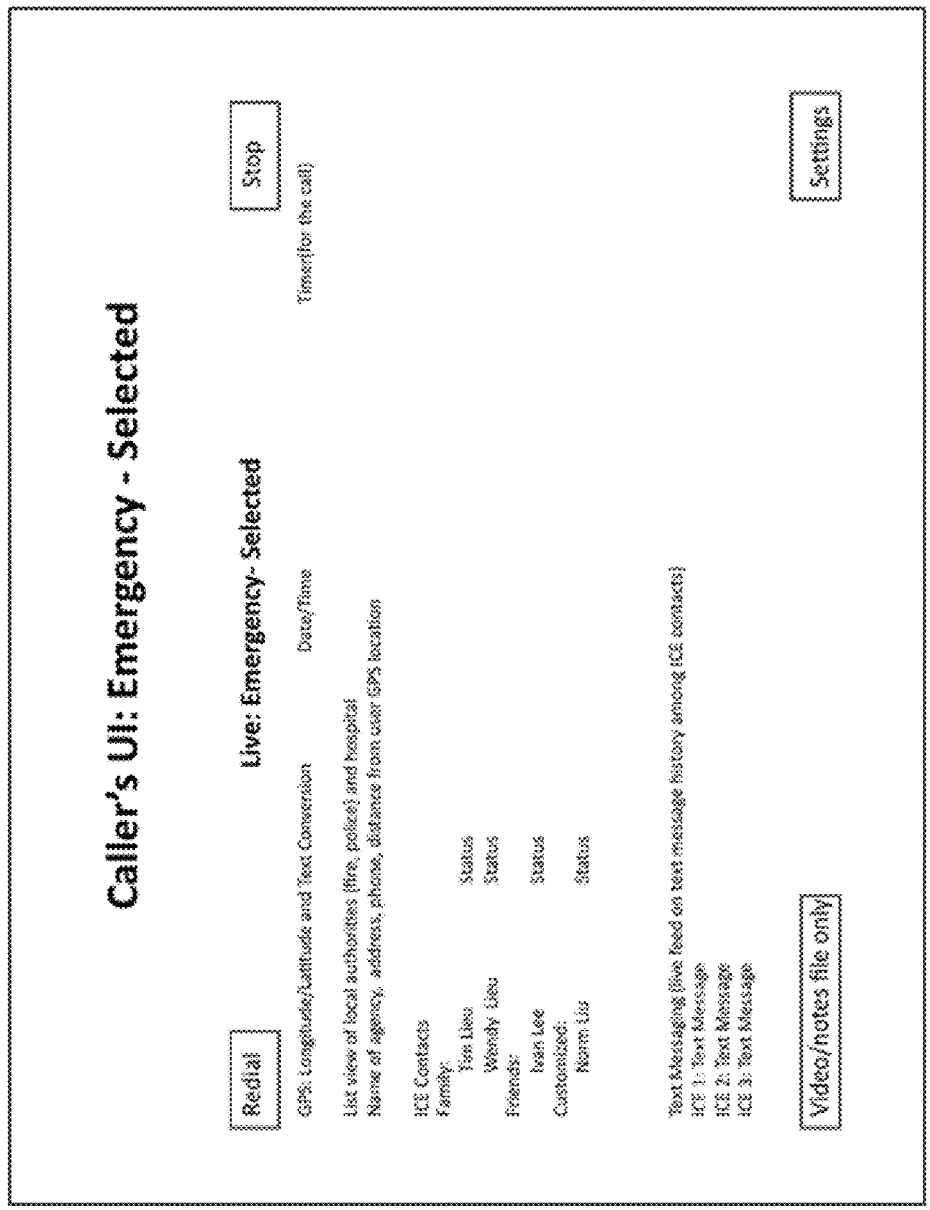
FIG. 6 is an exemplary user interface in the form of an emergency selected information page.

FIG. 5 is an exemplary user interface in the form of an emergency default information page. The default information page may comprise a redial button that activates any redial schemas established by the reporting party, a stop button that terminates the transmission of emergency alerts, a video/notes button which activates video capturing on the communications device, and/or a settings button which opens a settings user interface such as the setting page of FIG. 12. The emergency default page may also include information such as emergency contacts, location based information for the communications device, a timer that displays the duration of the call, personal information of the reporting party, and/or messages communicated between emergency contacts. This page may be displayed to the reporting party via the communications device, or to an emergency response entity and/or emergency contact.

Figure 7:
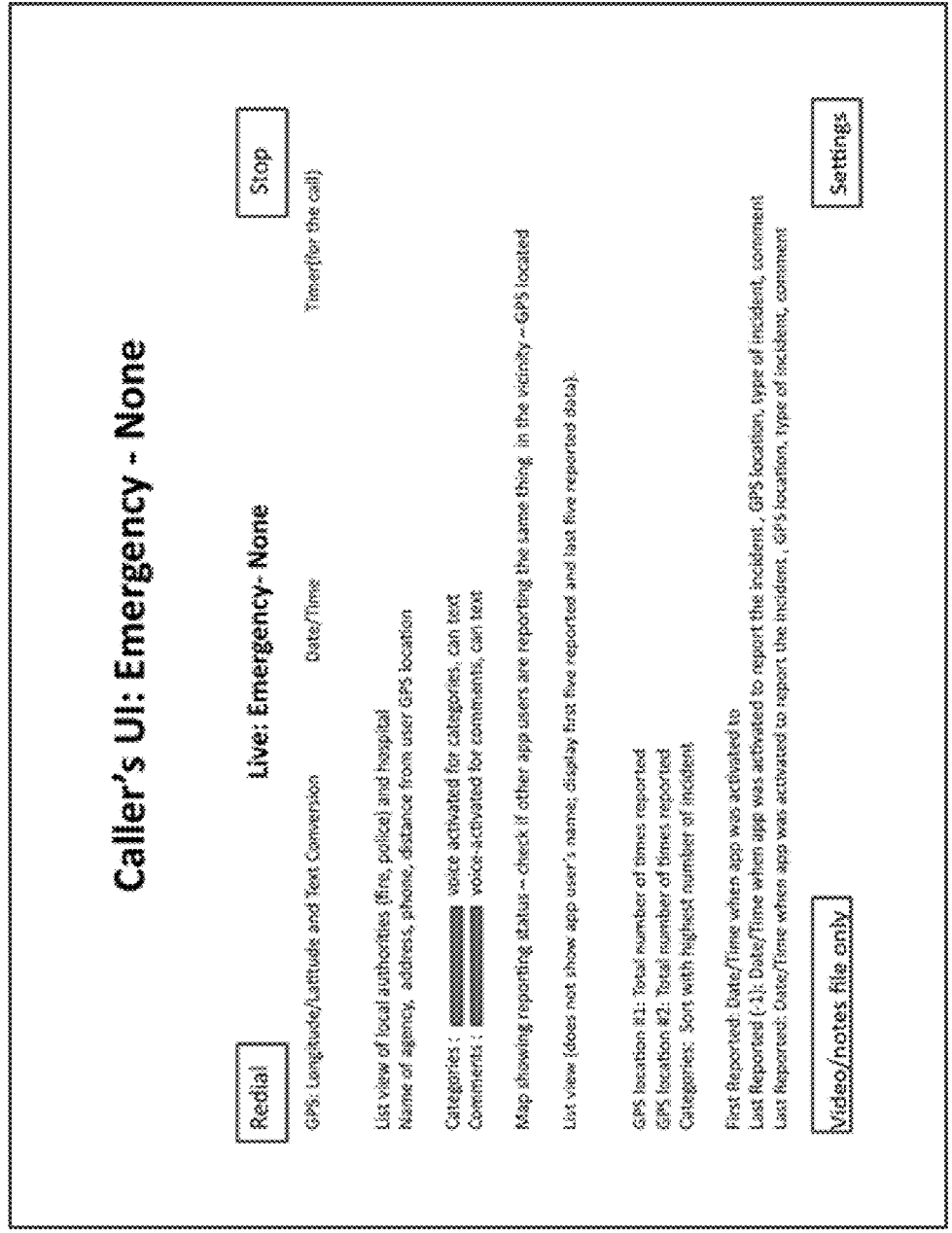
FIG. 7 is an exemplary user interface in the form of an emergency event information page.
Figure 8:
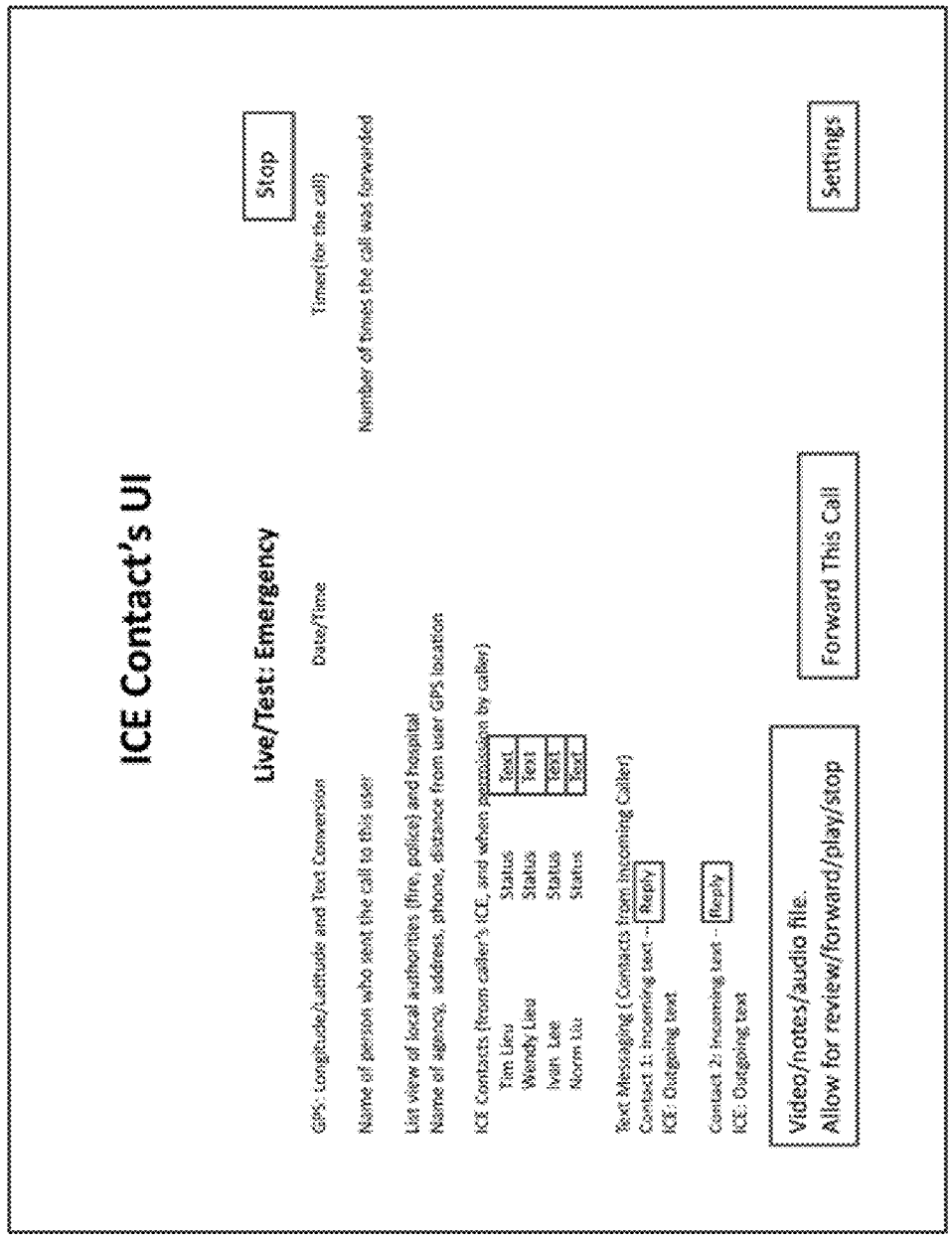
FIG. 8 is an exemplary user interface in the form of a contact testing page.
Figure 9:
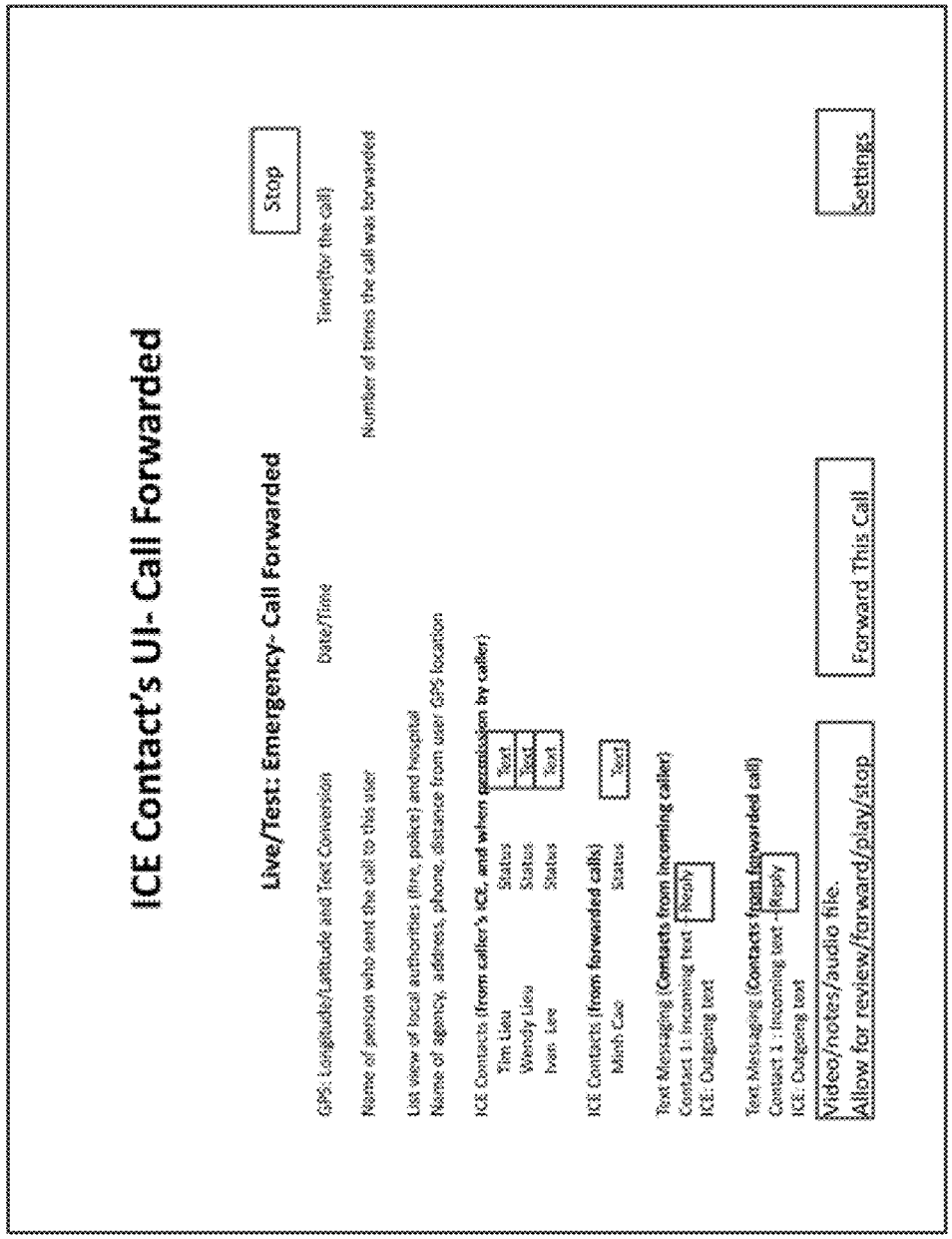
FIG. 9 is an exemplary user interface in the form of a call forwarding information page.
Figure 10:
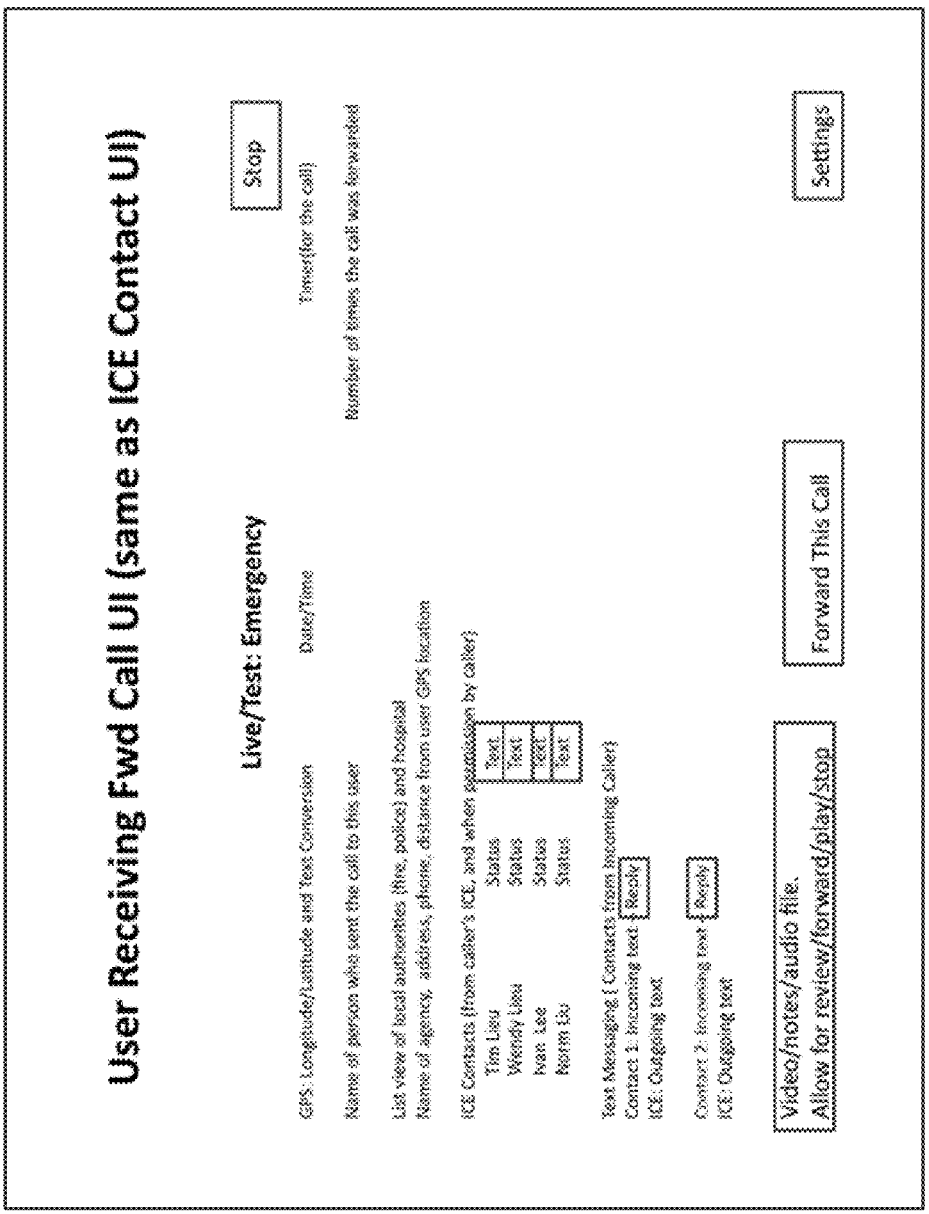
FIG. 10 is an exemplary user interface in the form of receiving call forward page.
Figure 11:
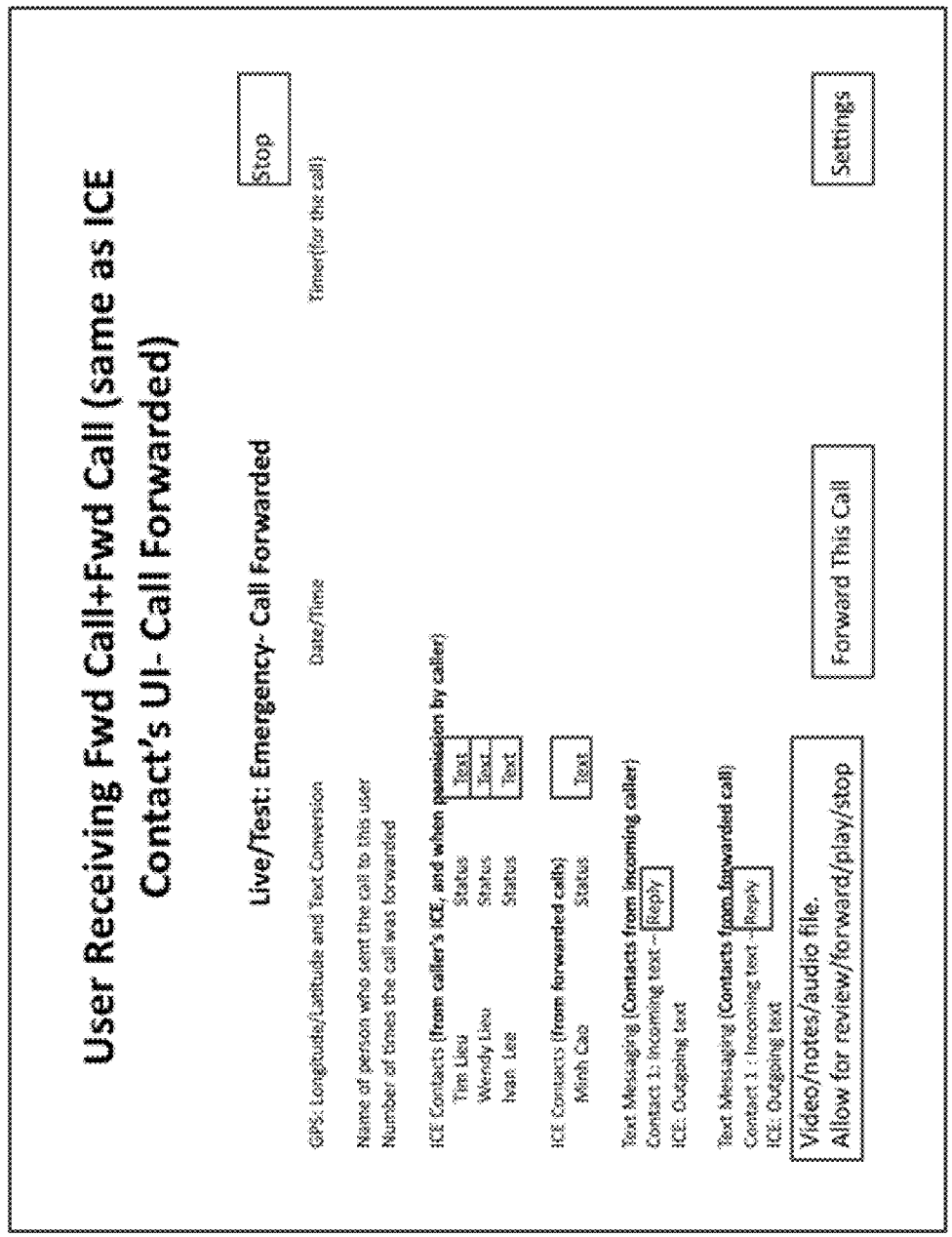
FIG. 11 is an exemplary user interface in the form of another receiving call forward page.

FIG. 7 is an exemplary user interface in the form of an emergency event information page. This page includes many different types of temporal and/or location based data for various reported emergency events that were logged by the reporting party and/or other previous reporting parties that are/were proximate the location of the reporting party.

FIGS. 8-11 are various exemplary user interfaces in the form of a contact testing pages and call forwarding pages. Each emergency contact may be provided with a test button, such that the responding party may send test signals to each of the emergency contacts. Additionally, the page may comprise reply buttons that allow the reporting party to send messages to emergency contacts from which messages have been received. The page may also include a media review button, which when engaged, allows another party to review/forward/stop media captured by the reporting party during an emergency event. Additionally, the page may include a Forward This Call button that allows the reporting party to forward an emergency call to anyone on their emergency contact list.

Figure 12:
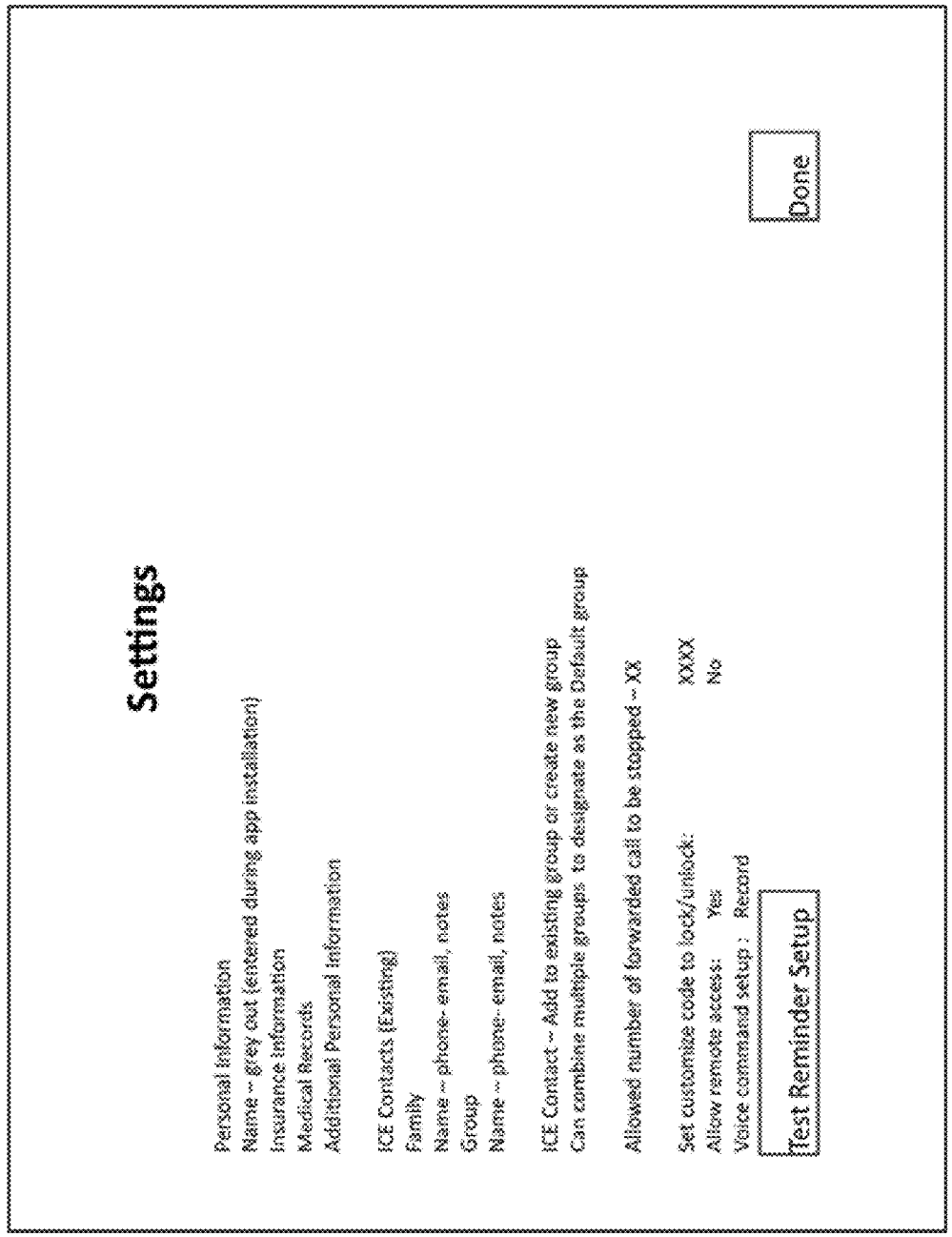
FIG. 12 is an exemplary user interface in the form of a settings page.

FIG. 12 is an exemplary user interface in the form of a settings page. Reporting parties (or emergency contacts) may input personal information such as name, medical information, insurance information, contact information, and so forth. The reporting party may also use the settings page to establish a list of emergency contacts, emergency response entity contact information, and so forth. Advantageously, the settings page may also display historical information that includes data such as emergency event data such as call attempts, call duration, call parties, call test results, and other pertinent emergency event related information. In some instances, the settings page may include a Test Reminder Setup button that allows the reporting party to establish a schedule for testing the functionalities of the system such as communications path testing.

Figure 12A:
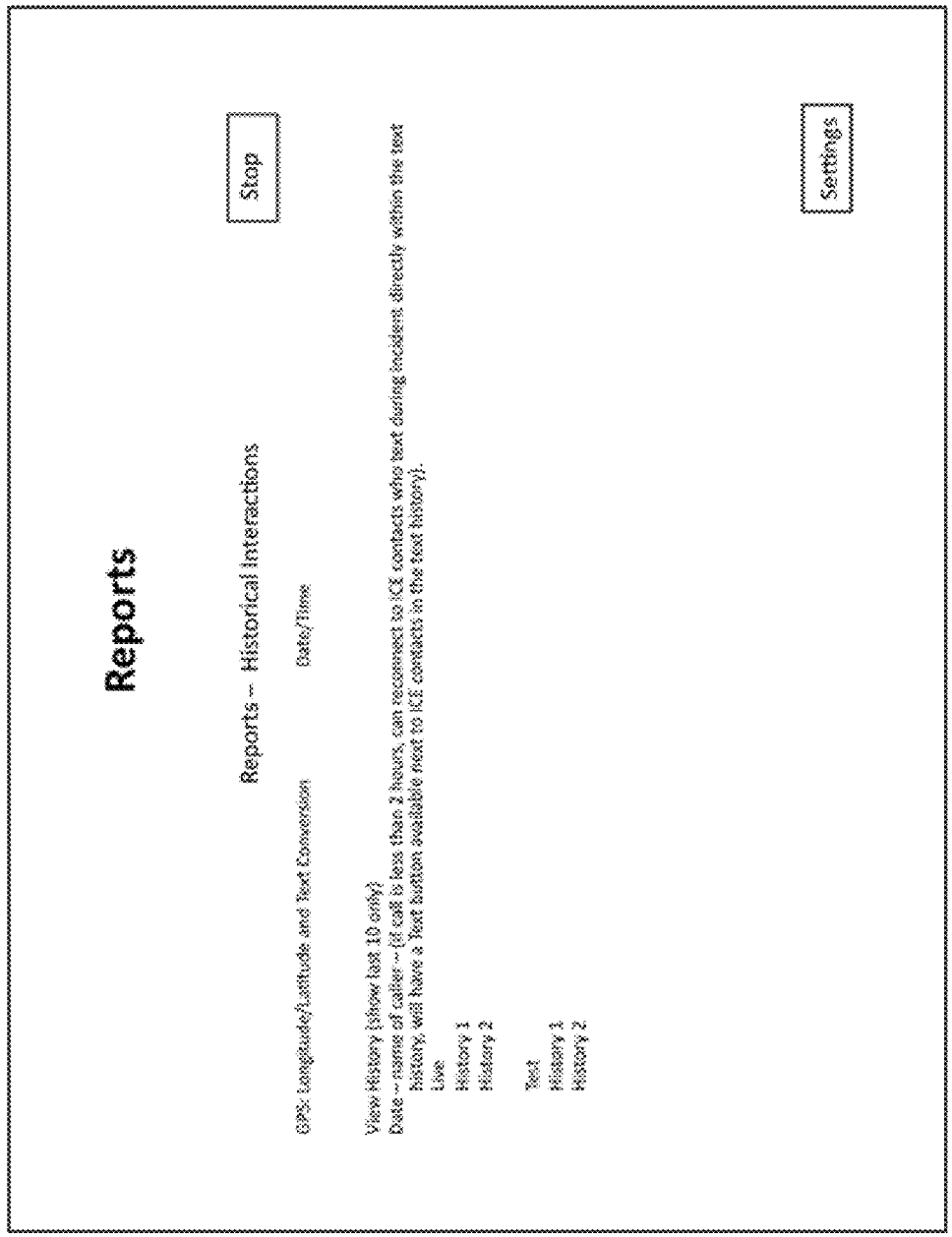
FIG. 12A is an exemplary user interface in the form of a historical reports page.

FIG. 12A illustrates an exemplary user interface in the form of a historical reporting page. The reporting page may include information regarding a previous emergency events and/or other historical information such as call testing information.

Figure 12B:
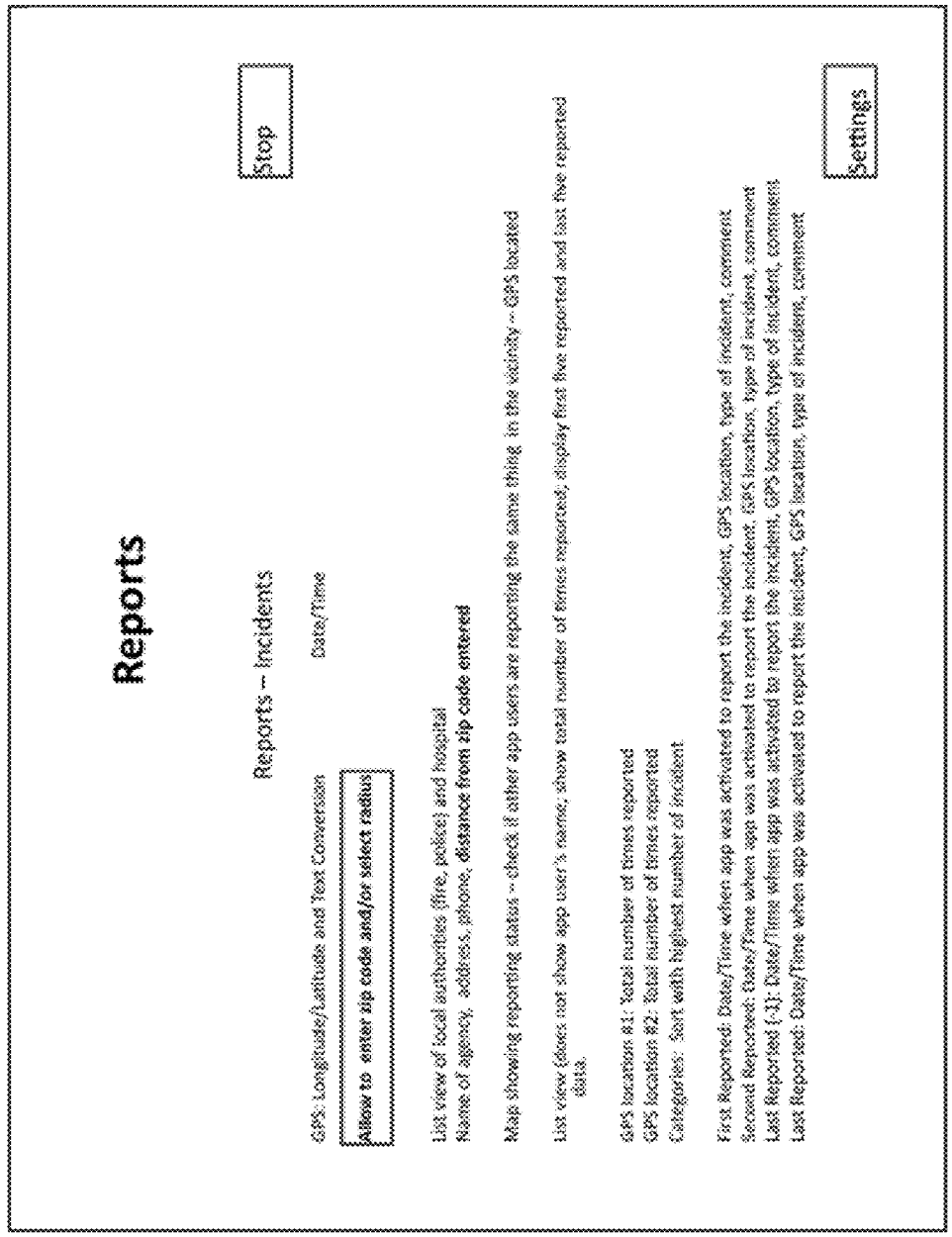
FIG. 12B is an exemplary user interface in the form of an incidents reports page.

FIG. 12B illustrates an exemplary user interface in the form of an incidents reporting page. The incidents reporting page may include reports on incidents (e.g., emergency events) reported within a given vicinity, which is selectable by the end user. For example, the end user can specify an incident review area based upon a zip code or radius from G.P.S. location.

Figure 13:
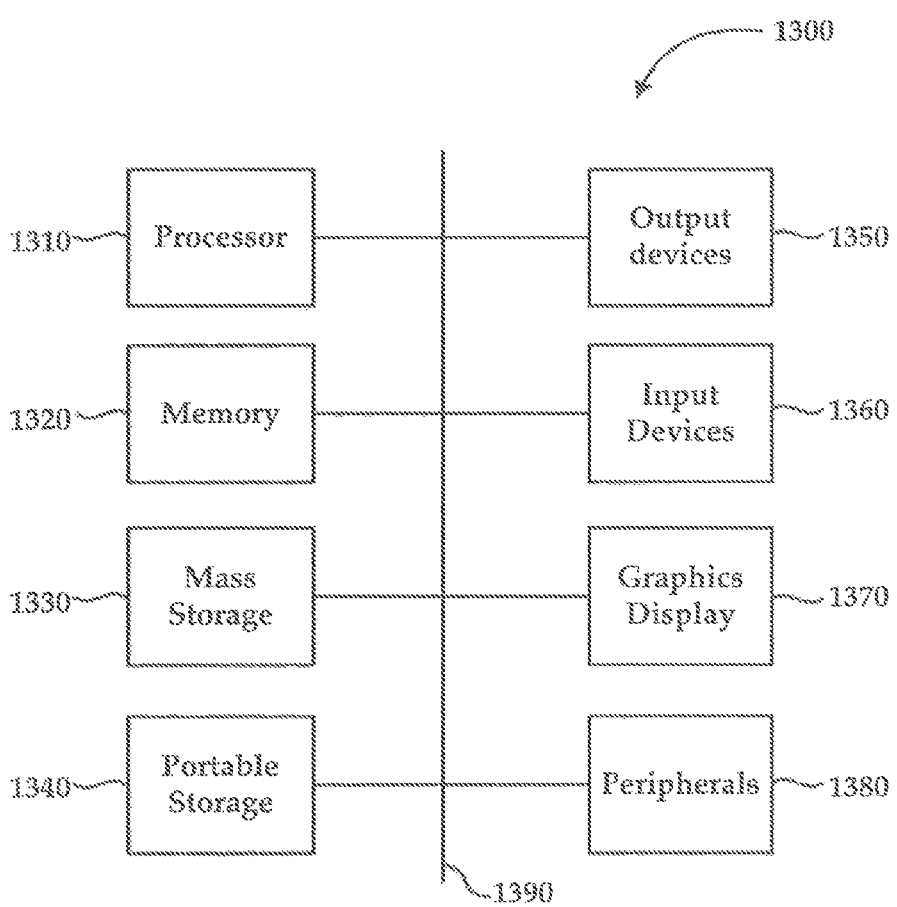
FIG. 13 is a block diagram of an exemplary computing system for implementing embodiments of the present technology.

FIG. 13 illustrates an exemplary computing system 1300 that may be used to implement an embodiment of the present technology. The system 1300 of FIG. 13 may be implemented in the contexts of the likes of computing systems, networks, servers, or combinations thereof. The computing system 1300 of FIG. 13 includes one or more processors 1310 and main memory 1320. Main memory 1320 stores, in part, instructions and data for execution by processor 1310. Main memory 1320 may store the executable code when in operation. The system 1300 of FIG. 13 further includes a mass storage device 1330, portable storage medium drive(s) 1340, output devices 1350, user input devices 1360, a graphics display 1370, and peripheral device(s) 1380.

The components shown in FIG. 13 are depicted as being connected via a single bus 1390. The components may be connected through one or more data transport means. Processor unit 1310 and main memory 1320 may be connected via a local microprocessor bus, and the mass storage device 1330, peripheral device(s) 1380, portable storage device 1340, and graphics display 1370 may be connected via one or more input/output (I/O) buses.

Mass storage device 1330, which may be implemented with a magnetic disk drive or an optical disk drive, is a non-volatile storage device for storing data and instructions for use by processor unit 1310. Mass storage device 1330 may store the system software for implementing embodiments of the present invention for purposes of loading that software into main memory 1320.

Portable storage medium drive(s) 1340 operates in conjunction with a portable non-volatile storage medium, such as a floppy disk, compact disk, digital video disc, or USB storage device, to input and output data and code to and from the computer system 1300 of FIG. 13. The system software for implementing embodiments of the present invention may be stored on such a portable medium and input to the computer system 1300 via the portable storage medium drive(s) 1340.

Input devices 1360 provide a portion of a user interface. Input devices 1360 may include an alphanumeric keypad, such as a keyboard, for inputting alpha-numeric and other information, or a pointing device, such as a mouse, a trackball, stylus, or cursor direction keys. Additionally, the system 1300 as shown in FIG. 13 includes output devices 1350. Suitable output devices include speakers, printers, network interfaces, and monitors.

Graphics display 1370 may include a liquid crystal display (LCD) or other suitable display device. Graphics display 1370 receives textual and graphical information, and processes the information for output to the display device.

Peripheral device(s) 1380 may include any type of computer support device to add additional functionality to the computer system. Peripheral device(s) 1380 may include a modem or a router.

The components provided in the computer system 1300 of FIG. 13 are those typically found in computer systems that may be suitable for use with embodiments of the present invention and are intended to represent a broad category of such computer components that are well known in the art. Thus, the computer system 1300 of FIG. 13 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for transmitting an alert communication, the method comprising:
    activating at least one media capturing device of a communications device associated with a reporting party upon an occurrence of an emergency event;
    establishing a communications path with an emergency response entity; and
    transmitting a location of the communications device and visual content captured by the at least one media capturing device of the communications device to the emergency response entity;
    disabling the communications device upon receipt of a disable command by the communications device from an authorized party, wherein the disable command is sound-based input received by the communications device;
    prior to establishing a communications path with an emergency response entity, executing a test transmission of an alert communication by transmitting a location of the communications device and visual content captured by the at least one media capturing device of the communications device to an intermediary server that is communicatively couplable with the emergency response entity, the communications device, and one or more emergency contacts, wherein the intermediary server sends a test signal to any of the emergency response entity and the one or more emergency contacts.

2. The method according to claim 1, further comprising:
    periodically activating an image capturing device of the communications device to obtain image files over a period of time; and
    uploading the image files from the communications device to any of a server or the emergency response entity.

3. The method according to claim 1, further comprising transmitting a silence message to the emergency response entity to inform the emergency response entity that verbal communication is prohibited.

4. The method according to claim 1, further comprising receiving authentication information prior to transmitting the alert communication.

5. The method according to claim 1, wherein the communications path comprises any of a wired or wireless telecommunications path, a TCP/IP path, a VOIP path, a WiFi path, or combinations thereof.

6. The method according to claim 1, wherein establishing a communications path with an emergency response entity further comprises establishing a TCP/IP path between the emergency response entity and the communications device when a wired or wireless telecommunications path cannot be established between the emergency response entity and the communications device.

7. The method according to claim 1, further comprising providing a list of emergency events arranged onto a map, the emergency events having occurred within a given time period and a given location, based upon the location of the communications device of the reporting party.

8. The method according to claim 7, further comprising providing advertisements to the communications device of the reporting party, the advertisements being associated with merchants located within the given location.

9. The method according to claim 1, further comprising playing an audible sound from the communications device upon an occurrence of an emergency event.

10. The method according to claim 1, further comprising providing at least a portion of the alert communication to at least one non-emergency response entity; and recording at least a portion of the alert communication.

11. The method according to claim 1, further comprising redialing any of an emergency response entity or an emergency contact when the emergency response entity or the emergency contact are unavailable.

* * * * *